United States Patent
Deng et al.

(10) Patent No.: US 10,659,699 B2
(45) Date of Patent: May 19, 2020

(54) APPARATUS AND METHOD FOR RECONSTRUCTING A THREE-DIMENSIONAL PROFILE OF A TARGET SURFACE

(71) Applicants: Jiangwen Deng, Kwai Chung (HK); Wui Fung Sze, Kwai Chung (HK); Qi Lang, Kwai Chung (HK)

(72) Inventors: Jiangwen Deng, Kwai Chung (HK); Wui Fung Sze, Kwai Chung (HK); Qi Lang, Kwai Chung (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 138 days.

(21) Appl. No.: 14/326,630

(22) Filed: Jul. 9, 2014

(65) Prior Publication Data
US 2016/0014315 A1    Jan. 14, 2016

(51) Int. Cl.
| | |
|---|---|
| *H04N 5/235* | (2006.01) |
| *G01B 11/25* | (2006.01) |
| *G06T 7/521* | (2017.01) |

(52) U.S. Cl.
CPC ........... *H04N 5/2354* (2013.01); *G01B 11/25* (2013.01); *G06T 7/521* (2017.01)

(58) Field of Classification Search
USPC ......................................................... 348/46
See application file for complete search history.

(56) References Cited

U.S. PATENT DOCUMENTS

| | | | |
|---|---|---|---|
| 5,307,152 A * | 4/1994 | Boehnlein | G06T 7/521 250/237 G |
| 6,049,384 A | 4/2000 | Rudd et al. | |
| 6,690,474 B1 * | 2/2004 | Shirley | G01B 11/2527 356/512 |
| 6,750,974 B2 | 6/2004 | Svetkoff et al. | |

(Continued)

FOREIGN PATENT DOCUMENTS

WO   WO 2004/008069 A1   1/2004

OTHER PUBLICATIONS

Second Office Action with Search Report dated Jan. 18, 2017 in corresponding Taiwanese Patent Application No. 104120508 (with English language translation of relevant portions)(total 11 pages).

*Primary Examiner* — Christopher S Kelley
*Assistant Examiner* — Ana Picon-Feliciano
(74) *Attorney, Agent, or Firm* — Ostrolenk Faber LLP

(57) ABSTRACT

Disclosed is an apparatus for reconstructing a three-dimensional profile of a target surface of an object. The apparatus comprises: i) a lighting apparatus having at least two modes of illumination to illuminate the target surface, wherein a first mode of illumination produces a pattern onto the target surface and a second mode of illumination illuminates every part of the target surface; ii) an imaging device for capturing respective images of the target surface upon a sequential activation of the first and second modes of illumination of the target surface by the lighting apparatus; and iii) a processor for reconstructing the three-dimensional profile of the target surface based on the images of the target surface as captured by the imaging device. A method of reconstructing a 3D profile of a target surface of an object is also disclosed.

8 Claims, 4 Drawing Sheets

(56) References Cited

U.S. PATENT DOCUMENTS

| | | | | |
|---|---|---|---|---|
| 8,103,331 B2* | 1/2012 | Hoyt | .................... | A61B 5/0059 |
| | | | | 356/317 |
| 2009/0238449 A1* | 9/2009 | Zhang | ................ | G01B 11/2536 |
| | | | | 382/165 |
| 2010/0008588 A1* | 1/2010 | Feldkhun | ........... | G01B 11/2518 |
| | | | | 382/206 |
| 2010/0020078 A1* | 1/2010 | Shpunt | .................. | G01B 11/25 |
| | | | | 345/420 |
| 2010/0149315 A1* | 6/2010 | Qu | .................... | A61B 1/00193 |
| | | | | 348/46 |
| 2011/0310393 A1* | 12/2011 | Smirnov | ............ | G01N 21/4788 |
| | | | | 356/446 |

* cited by examiner

APPARATUS AND METHOD FOR RECONSTRUCTING A THREE-DIMENSIONAL PROFILE OF A TARGET SURFACE

FIELD OF THE INVENTION

This invention relates to an apparatus for, and a method of, reconstructing a three-dimensional (3D) profile of a target surface of an object including, particularly but not exclusively, an image sensor substrate with epoxy for sensor bonding.

BACKGROUND OF THE INVENTION

The measurement of surface contours of an object using optical measurements of light reflected from a target surface of the object is generally known. For instance, the use of two-phased patterns for reconstructing a 3D profile of an object is disclosed in U.S. Pat. No. 6,049,384.

As shown in FIG. 1a, the apparatus 100 disclosed in U.S. Pat. No. 6,049,384 comprises: i) first and second lighting devices 102, 104; ii) a timing circuit 106 coupled to the first and second lighting devices 102, 104; iii) a reticle 108 having alternating areas of metallized and transparent strips; iv) a detector 112; and v) a processor 114. When the timing circuit 106 activates only the first lighting device 102, light is projected from the first lighting device 102 onto the reticle 108 and a target surface 110 of an object along a single line of travel as shown. In particular, the transparent strips of the reticle 108 allow light to pass through to reach the target surface 110 while the metallized strips reflect light away from the target surface 110. Consequently, a pattern comprising a plurality of strips alternating between different light intensities is formed on the target surface 110, as shown in FIG. 1b.

On the other hand, when the timing circuit 106 activates only the second lighting device 104, light projected from the second lighting device 104 onto the reticle 108 and the target object 110 along different lines of travel as shown. In particular, the metallized strips of the reticle 108 reflect light towards the target surface 110 while the transparent strips of the reticle 108 allow light to pass through in a direction away from the target surface 110. Thus, a pattern comprising a plurality of strips alternating between different light intensities is also formed on the surface of the target object 110, as shown in FIG. 1c.

The detector 112, arranged at a triangulation angle ∅ relative to a focal plane of light projection by the lighting devices 102, 104, is adapted to capture respective images of the patterns as formed on the surface of the target surface 110 upon a sequential projection of light by each of the first and second lighting devices 102, 104. Based on the images as imaged by the detector 112, the processor 114 accordingly produces a 3D image of the surface of the target object 110.

It should be noted that the respective patterns of FIGS. 1b and 1c are exactly aligned but 180° out of phase. In order to achieve these pattern requirements, the position of the lighting devices 102, 104 must conform to a certain relationship. In other words, a positional adjustment of any of the lighting devices 102, 104 necessitates a corresponding positional adjustment of the other of the lighting devices 102, 104. Moreover, a positional adjustment of the reticle 108 also necessitates a corresponding positional adjustment of both the lighting devices 102, 104. Such requirements undesirably complicate the assembling of the apparatus 100. Furthermore, the angle of the reticle 108 is constrained by the angle of light projection from the lighting devices 102, 104 and, accordingly, the focal plane of light projection may not align with the object plane of the target surface 110. This may undesirably cause uneven periods and fringe amplitudes of the patterns that are formed on the target surface 110.

It is therefore an object of the present invention to seek to ameliorate the above limitations of the conventional apparatus 100, and to provide the general public with a useful choice.

SUMMARY OF THE INVENTION

A first aspect of the invention is an apparatus for reconstructing a three-dimensional profile of a target surface of an object. Specifically, the apparatus comprises: i) a lighting apparatus having at least two modes of illumination to illuminate the target surface, wherein a first mode of illumination produces a pattern onto the target surface and a second mode of illumination illuminates every part of the target surface; ii) an imaging device for capturing respective images of the target surface upon a sequential activation of the first and second modes of illumination of the target surface by the lighting apparatus; and iii) a processor for reconstructing the three-dimensional profile of the target surface based on the images of the target surface as captured by the imaging device.

Optionally, the lighting apparatus may comprise: i) a grating; ii) a first lighting device arranged relative to the grating, so that the first lighting device is operable to project light onto the grating to thereby produce the pattern onto the target surface; and iii) a second lighting device is operable to project light to illuminate every part of the target surface.

Further, an optical device may also be included. In this instance, the grating is arranged between the optical device and the first lighting device so that light from the first lighting device that is projected onto the grating is reflected by the optical device to produce the grating pattern onto the target surface. The second lighting device, on the other hand, is arranged relative to the optical device so that light from the second lighting device is projected through the optical device onto the target surface to illuminate every part of the target surface. Examples of the optical device include a beam-splitter or a prism.

A second aspect of the invention is a method of reconstructing a three-dimensional profile of a target surface of an object. Specifically, the method comprises the steps of: sequentially activating at least two modes of illumination of a lighting apparatus to illuminate the target surface, wherein a first mode of illumination produces a pattern onto the target surface and a second mode of illumination illuminates every part of the target surface; using an imaging device to capture respective images of the target surface upon the target surface being illuminated by the at least two modes of illumination; and using a processor to reconstruct the three-dimensional profile of the target surface based on the images of the target surface as captured.

Optionally, wherein the lighting apparatus comprises a grating and first and second lighting devices, the method may specifically comprise the steps of: the first lighting device projecting light onto the grating to thereby produce the pattern onto the target surface; and the second lighting device projecting light to illuminate every part of the target surface.

Further, wherein the grating is arranged between a further optical device and the first lighting device, the method may further comprise the steps of: using the optical device to reflect light projected from the first lighting device and onto the grating, so as to produce the pattern onto the target surface; and projecting light from the second lighting device through the optical device, so as to illuminate every part of the target surface.

BRIEF DESCRIPTION OF THE DRAWINGS

A preferred embodiment of this invention will now be described, by way of example only, with reference to the accompanying drawings, in which:

FIG. 1a shows a conventional 3D imaging apparatus which forms multi-phased patterns on a target surface of an object, while

FIG. 3a shows an exemplary image of the target surface comprising a pattern produced by the apparatus of FIG. 2, while

FIG. 3c shows an exemplary normalized fringe image, while

DETAILED DESCRIPTION OF THE PREFERRED EMBODIMENT

Figure 1A:
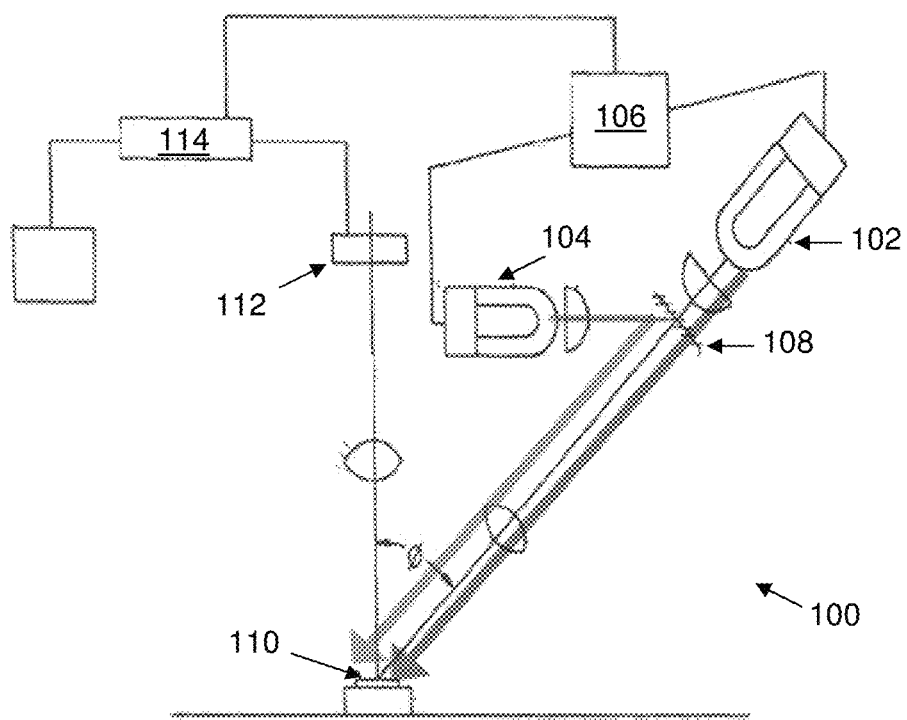
Figures 1B, 1C:
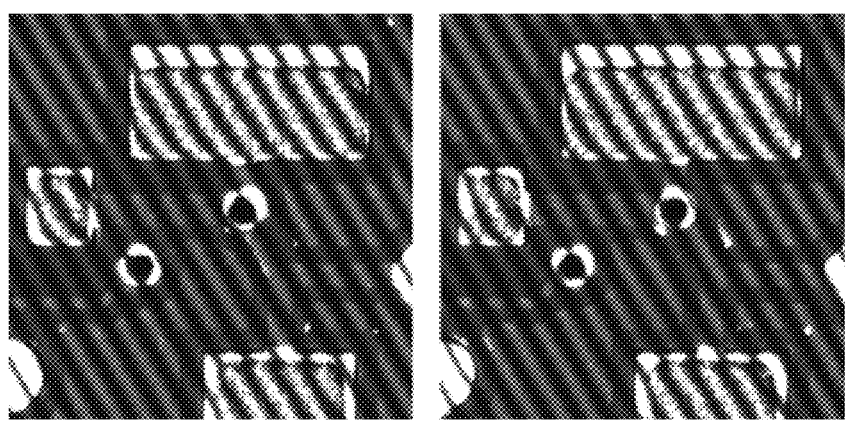
FIGS. 1b and 1c show the multi-phased patterns which are exactly aligned but out of phase by 180°.
Figure 2:
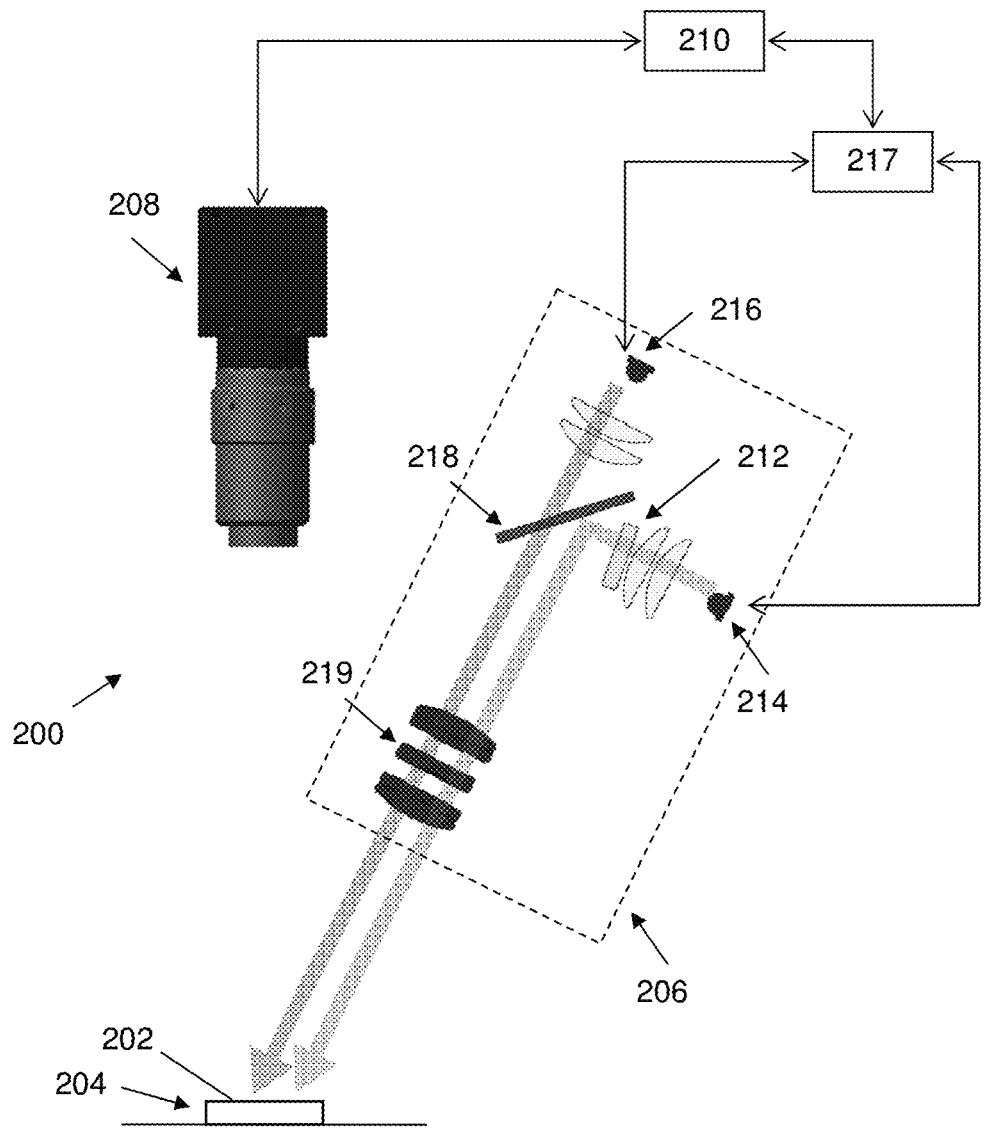
FIG. 2 shows an apparatus for reconstructing a 3D profile of a target surface of an object according to a preferred embodiment of this invention.

FIG. 2 show an apparatus 200 for reconstructing a 3D profile of a target surface 202 of an object 204, wherein the apparatus 200 comprises: i) a lighting apparatus 206 for illuminating the target surface 202; ii) an imaging device 208 (e.g. a camera) for imaging the target surface 202 upon the target surface 202 being illuminated by the lighting apparatus 206; iii) an lighting control apparatus 217 for controlling lighting on & off and iv) a processor 210 for reconstructing a 3D profile of the target surface 202 based on the images of the target surface 202 as imaged by the imaging device 208. An example of the target surface 202 is an image sensor substrate surface on which epoxy adhesives are to be dispensed for sensor bonding.

The lighting apparatus 206 is operable in two modes of illumination to illuminate the target surface 202—a first mode of illumination produces a pattern based on the structure of the grating 212 on the target surface 202, whereas a second mode of illumination illuminates every part of the target surface 202. Specifically, the lighting apparatus 206 comprises a grating 212 and a first lighting device 214 arranged relative to the grating 212 so that when light is projected from the first lighting device 214 onto the grating 212, the said pattern is produced on the target surface 202. Further, the lighting apparatus 206 comprises a second lighting device 216 for illuminating every part of the target surface 202. By activating only one of the first and second lighting devices 214, 216, the lighting apparatus 206 is operable in the two modes of illumination to illuminate the target surface 202. The activation of lighting devices 214 and 216 is controlled by the lighting control apparatus 217 (e.g. LED driver system). Preferably, the pattern is repetitive.

Figure 3A:
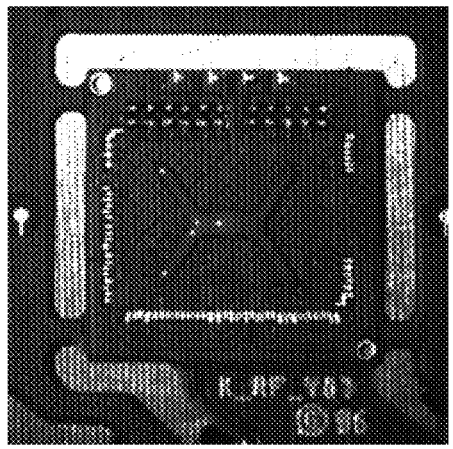
Figure 3B:
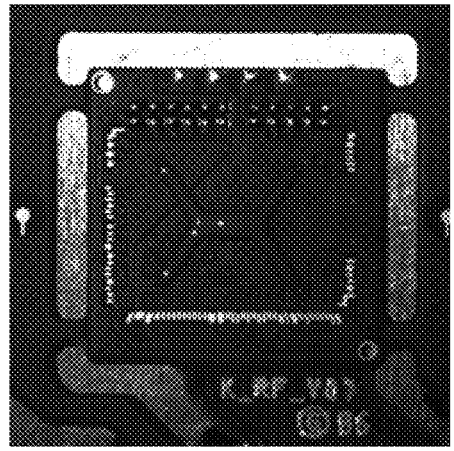
FIG. 3b shows an exemplary image wherein every part of the target surface is illuminated by the apparatus of FIG. 2.

FIG. 3a shows an exemplary image of the target surface 202 comprising the said pattern produced by the lighting apparatus 206 in the first mode of illumination, while FIG. 3b shows an exemplary image wherein every part of the target surface 202 is illuminated by the apparatus 206 in the second mode of illumination.

Additionally, a plate beam-splitter 218 is comprised in the lighting apparatus 206, so that light can be projected from the first and second lighting devices 214, 216 illuminate the target surface 202 at a desired angle (e.g. 90°) relative to the target surface 202. A set of lens module is used to form an image of the grating 212 on the target surface 202. More specifically, the image of the grating 212 produced by light projected from the first lighting device 214 is reflected by the plate beam-splitter 218 to thereby produce the said pattern on the target surface 202. On the other hand, the second lighting device 216 is arranged perpendicularly relative to both the first lighting device 214 and the plate beam-splitter 218, so that light projected from the second lighting device 216 passes through the plate beam-splitter 218 towards the target surface 202 to illuminate every part of the target surface 202.

However, it should be appreciated that the lighting apparatus 206 may comprise only a single lighting device for achieving the two modes of illumination in producing the said pattern on the target surface 202 and in illuminating every part of the target surface 202. This may be achieved by configuring the grating 212 to be movable, so that light projected from the single lighting device onto the grating 212 produces the said pattern on the target surface 202 in the first mode of illumination, and that the grating 212 moves away so that the single lighting device projects light directly onto the target surface 202 to illuminate every part of the target surface 202 in the second mode of illumination. It should also be appreciated that the beam-splitter 218 is optional if the one or more lighting devices can be arranged accordingly relative to the target surface 202 during the various modes of illumination (which are not limited to the two modes as described above). Moreover, any optical device (e.g. a prism or cube beam splitter) may be used instead of the plate beam-splitter 218, so long as it can achieve the intended purposes of the various modes of illumination.

Upon a sequential activation of the first and second modes of illumination of the target surface 202 by the lighting apparatus 206, the imaging device 208 captures respective images of the target surface 202 which are then transmitted onward to the processor 210 for image processing to reconstruct the 3D profile of the target surface 202 (more details below).

The principles of the operation of the apparatus 200 as shown in FIG. 2 will now be explained using a sinusoidal pattern.

A point x constituting images of the target surface 202 when sequentially illuminated by the lighting apparatus 206 in the first and second modes of illumination may be mathematically expressed respectively as follows:

$$I_1 = r.L_1.(1 + m.\cos\theta) \quad (1)$$

$$I_2 = r.L_2 \quad (2)$$

wherein $I_1$ and $I_2$ are the respective intensities of light as detected by the imaging device 208; r is the reflectivity of the target surface 202; $L_1$ and $L_2$ are factors relating to the lighting strength of the first and second lighting devices 214, 216 respectively; m is the fringe modulation and is related to the fringe amplitude of the sinusoidal (i.e. repetitive) pattern, the material properties of the object 204 as well as the focus between the target surface 202 and the associated optics and lighting devices; and θ is the phase angle relating to the pattern produced by the lighting apparatus 206 on the target surface 202 based on the structure of the grating 212.

Since $L_1$ and $L_2$ of the first and second lighting devices 214, 216 can be calibrated in advance, Equations (1) and (2) may be simplified as follows:

$$I_1 = r.(1+m.\cos\theta) \quad (3)$$

$$I_2 = r \quad (4)$$

It should be noted that a corresponding fringe pattern, which is 180° out of phase from the sinusoidal pattern as produced on the target surface 202, can be normalized (i.e. excluding the image of the target surface 202 itself) and expressed in the ratio, R, as follows:

$$R = (I_1 - I_2)/I_2 = m.\cos\theta \quad (5)$$

Figure 3C:
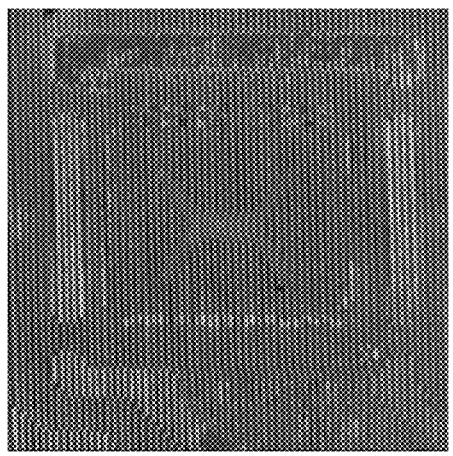

FIG. 3c shows an exemplary image of a fringe pattern that is derived from Equation (5). In particular, the phase angle $\theta$ indicates where the said pattern is positioned on the target surface 202. This means that the lateral position of the said pattern serves as a function of the height of the target surface 202. By solving for the phase angle $\theta$, the various heights h of the target surface 202 can accordingly be determined by the following equation:

$$\theta = \omega_z h + \theta_0 \quad (6)$$

$$h = (\theta - \theta_0)/\omega_z \quad (7)$$

where the parameter $\omega_z$ is the vertical angular frequency (rate of phase change due to height) and the parameter $\theta_0$ is the phase value at reference level (i.e. h=0). These two parameters $\omega_z$ and $\theta_0$ can be obtained by calibration.

Since Equation (5) involves the two unknowns relating to the modulation m and the phase angle $\theta$, another equation is generally required to solve for these two unknowns.

As a preliminary, for inspecting target objects having a stable modulation m, the value of m can either be calibrated or learnt. In such instances, Equation (5) alone is sufficient for the calculation of the phase angle $\theta$, which can be computed by the following equation:

$$\theta = \cos^{-1}[(I_1 - I_2)/m.I_2)] \quad (8)$$

However, in cases where the learning of m is not appropriate, but yet a flatness constraint can be imposed, the value of the phase angle $\theta$ can be derived from the light intensity of neighbouring points of x as detected by the imaging device 208. Specifically, suppose $I'_1$ and $I'_2$ are the respective intensities of light of the said neighbouring points of x as detected by the imaging device 208, this yields a further equation as follows:

$$R' = (I'_1 - I'_2)/I'_2 = m.\cos(\theta+\delta) = m.[\cos\theta\cos\delta - \sin\theta\sin\delta] \quad (9)$$

Accordingly, Equations (5) and (9) can be used to solve the two unknowns of the modulation m and the phase angle $\theta$, based on the following mathematical manipulation:

$$R'/R = \cos\delta - \tan\theta\sin\delta \quad (10)$$

$$\theta = \tan^{-1}[\cot\delta - (R'/R)(\sec\delta)] \quad (11)$$

wherein $\delta$ is a known phase change due to the displacement between the points x and x' of the normalized fringe pattern based on the sinusoidal pattern as produced on the target surface 202.

By solving for the phase angle $\theta$, Equation (7) can accordingly be solved to determine the various heights h of the target surface 202.

Figure 3D:
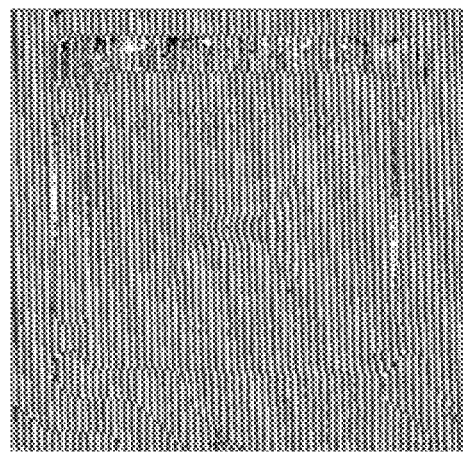
FIG. 3d shows an exemplary phase image.
Figure 4:
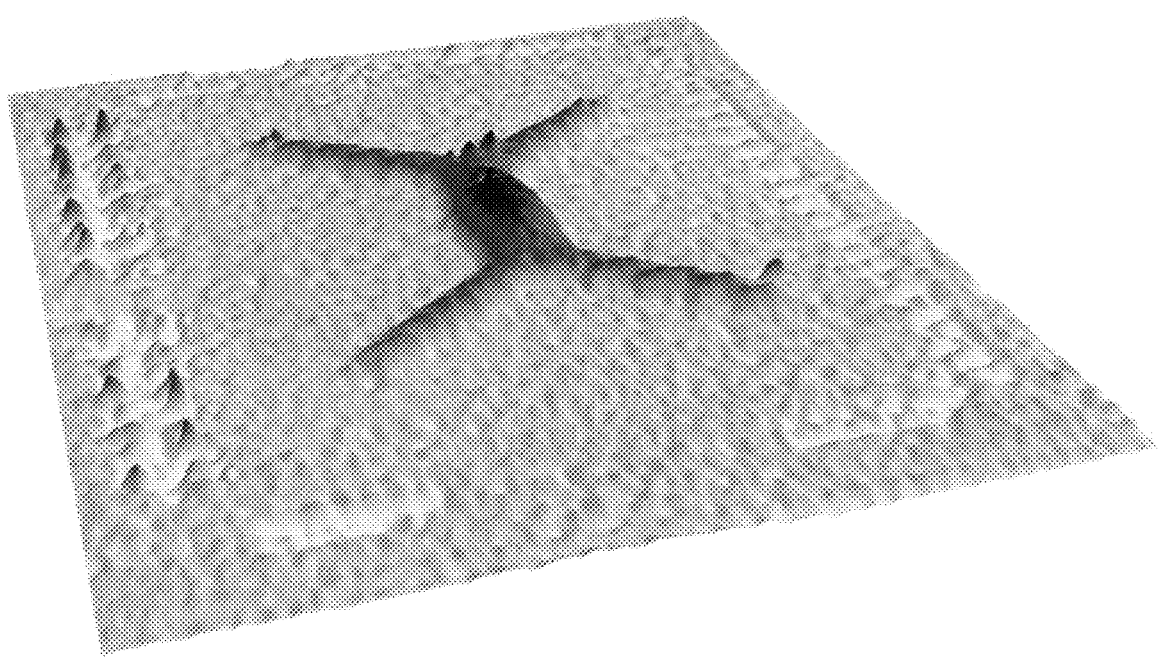
FIG. 4 shows an exemplary 3D profile of the target surface as reconstructed based on the images of FIGS. 3a and 3b.

FIG. 3d shows an exemplary phase image of the normalized fringe pattern as derived from Equation (11).

By requiring the apparatus 200 to include the lighting apparatus 206 that is operable in the two modes of illumination to illuminate the target surface 202, the position of the grating 212 can be easily adjusted to align with an object plane of the target object 204. Moreover, any positional adjustment of the grating 212 can be done without involving a corresponding positional adjustment of both the first and second lighting devices 214, 216. In addition, the apparatus 200 can also serve as a source of light for a complete illumination of the target surface 202 to perform image-related operations, such as pattern recognition using fiducials, and is not limited to only 3D-profile reconstructions of target surfaces as such.

It should be appreciated that various embodiments can also be envisaged without departing from the scope of the invention as claimed. For instance, the use of the apparatus 200 is not limited to a reconstruction of 3D profiles of substrate surface or lead frame surfaces, but may also include various other types of target surfaces such as surfaces of solder paste and printed circuit boards (PCBs) for mounting surface mounting devices in the field of surface mounting technology (SMT), and tool and mount surface for surface inspections.

The invention claimed is:

1. An apparatus for reconstructing a three-dimensional profile of a target surface of an object, the apparatus comprising:
    a lighting apparatus having at least a first mode of illumination to illuminate the target surface and at least a second mode of illumination to illuminate the target surface independent of the first mode of illumination, the lighting apparatus having a first lighting device to produce the first mode of illumination, which is a pattern onto the target surface and a second lighting device to produce the second mode of illumination, which illuminates every part of the target surface without a corresponding pattern, wherein light from the first and second modes of illumination are arranged to illuminate the target surface along a same angle of incidence and a ratio (R) of a difference of intensity between the first and second modes of illumination ($I_1$-$I_2$) against an intensity of the second mode of illumination ($I_2$, such that $R=(I_1-I_2)/I_2$) is constant across the profile of the target surface;
    a lighting control apparatus operative to sequentially activate only one of the at least two modes of illumination at a time;
    an imaging device operative to sequentially capture a first image of the target surface when the target surface is illuminated by the first mode of illumination and a second image of the target surface when the target surface is illuminated by the second mode of illumination respectively; and
    a processor for reconstructing the three-dimensional profile of the target surface based on a combination of image characteristics obtained from only the first and second images of the target surface as captured by the imaging device.

2. The apparatus of claim 1, wherein the lighting apparatus comprises:
    a grating;
    a first lighting device arranged relative to the grating, so that the first lighting device is operable to project light onto the grating to thereby produce the pattern onto the target surface; and
    a second lighting device is operable to project light to illuminate every part of the target surface.

3. The apparatus of claim 2, further comprising an optical device,
wherein the grating is arranged between the optical device and the first lighting device so that light from the first lighting device that is projected onto the grating is reflected by the optical device to produce the pattern onto the target surface, and
the second lighting device is arranged relative to the optical device, so that light from the second lighting device is projected through the optical device onto the target surface to illuminate every part of the target surface.

4. The apparatus of claim 3, wherein the optical device is a beam-splitter.

5. The apparatus of claim 3, wherein the optical device is a prism.

6. A method of reconstructing a three-dimensional profile of a target surface of an object, the method comprising the steps of:
sequentially activating at least two modes of illumination of a lighting apparatus having a first lighting device to produce a first mode of illumination to illuminate the target surface and a second lighting device to produce a second mode of illumination to illuminate the target surface, wherein the first mode of illumination is a pattern onto the target surface and the second mode of illumination illuminates every part of the target surface without a corresponding pattern, light from the first and second modes of illumination being arranged to illuminate the target surface along a same angle of incidence and a ratio (R) of a difference of intensity between the first and second modes of illumination $(I_1-I_2)$ against an intensity of the second mode of illumination $(I_2$, such that $R=(I_1-I_2)/I_2)$ is constant across he profile of the target surface;
wherein the step of sequentially activating at least two modes of illumination of a lighting apparatus to illuminate the target surface comprises the step of using a lighting control apparatus to control the lighting apparatus to sequentially activate only one of the at least two modes of illumination at a time;
using an imaging device to sequentially capture a first image of the target surface when the target surface is illuminated by the first mode of illumination and a second image of the target surface when the target surface is illuminated by the second mode of illumination respectively; and
using a processor to reconstruct the three-dimensional profile of the target surface based on a combination of image characteristics obtained from only the first and second images of the target surface as captured.

7. The method of claim 6, wherein the lighting apparatus comprises a grating and first and second lighting devices, the method comprising the steps of:
the first lighting device projecting light onto the grating to thereby produce the pattern onto the target surface; and
the second lighting device projecting light to illuminate every part of the target surface.

8. The method of claim 7, wherein the grating is arranged between a further optical device and the first lighting device, the method further comprising the steps of:
using the optical device to reflect light that is projected from the first lighting device and onto the grating, so as to produce the pattern onto the target surface; and
projecting light from the second lighting device through the optical device, so as to illuminate every part of the target surface.

* * * * *